United States Patent
Lee et al.

(10) Patent No.: US 9,924,011 B2
(45) Date of Patent: Mar. 20, 2018

(54) MANUAL BLUETOOTH HANDS FREE TRANSFER MODE

(71) Applicants: Hyundai Motor Company, Seoul (KR); Kia Motors Corporation, Seoul (KR); Hyundai America Technical Center, Inc., Superior Township, MI (US)

(72) Inventors: Jin Ho Lee, Gyeonggi-do (KR); Sherri Voran-Nowak, Superior Township, MI (US); Lisa Southwick, Superior Township, MI (US)

(73) Assignees: Hyundai Motor Company, Seoul (KR); Hyundai America Technical Center, Inc., Superior Township, MI (US); Kia Motors Corporation, Seoul (KR)

(*) Notice: Subject to any disclaimer, the term of this patent is extended or adjusted under 35 U.S.C. 154(b) by 0 days.

(21) Appl. No.: 14/473,765

(22) Filed: Aug. 29, 2014

(65) Prior Publication Data

US 2016/0065710 A1     Mar. 3, 2016

(51) Int. Cl.
| H04M 1/60 | (2006.01) |
| H04W 4/00 | (2009.01) |
| H04W 4/16 | (2009.01) |
| H04L 29/06 | (2006.01) |

(52) U.S. Cl.
CPC .......... *H04M 1/6091* (2013.01); *H04L 65/00* (2013.01); *H04W 4/008* (2013.01); *H04W 4/16* (2013.01)

(58) Field of Classification Search
CPC .... H04M 1/6033–1/6091; H04W 4/16; H04W 4/008
USPC .......... 455/41.2, 41.3, 569.1, 569.2
See application file for complete search history.

(56) References Cited

U.S. PATENT DOCUMENTS

| 7,079,015 | B2 | 7/2006 | Gibeau | |
| 2003/0032460 | A1* | 2/2003 | Cannon | H04M 1/6091 455/569.2 |
| 2004/0053573 | A1* | 3/2004 | Karusawa | H04M 1/6066 455/41.2 |
| 2004/0198464 | A1* | 10/2004 | Panian | H04M 1/6066 455/569.1 |
| 2005/0113149 | A1* | 5/2005 | Tamura | H04M 1/6041 455/569.1 |
| 2009/0244282 | A1* | 10/2009 | Eguiguren | 348/148 |
| 2010/0144400 | A1* | 6/2010 | Azuma | 455/569.2 |

(Continued)

FOREIGN PATENT DOCUMENTS

JP     2014082563 A  *  5/2014

*Primary Examiner* — Gennadiy Tsvey
(74) *Attorney, Agent, or Firm* — Mintz Levin Cohn Ferris Glovsky and Popeo, P.C.; Peter F. Corless (57) ABSTRACT

A method for controlling audio signal transfer from a mobile device to a hands-free device in a vehicle multimedia system includes receiving by a processor of the vehicle multimedia system a request from a mobile device to connect to a hands-free device. The processor determines if the mobile device is engaged in an active call. In response to determining that the mobile device is engaged in an active call, a confirmation message is displayed to confirm that a user wishes to transfer an audio signal associated with the active call to the hands-free device. In response to receiving user's confirmation to transfer the active call, the audio signal is transferred from the mobile device to the hands-free device.

16 Claims, 5 Drawing Sheets

(56) References Cited

U.S. PATENT DOCUMENTS

| | | | | |
|---|---|---|---|---|
| 2014/0031010 A1* | 1/2014 | Wuergler | .............. | H04W 4/046 |
| | | | | 455/411 |
| 2014/0155110 A1* | 6/2014 | Park | ..................... | H04W 76/02 |
| | | | | 455/458 |
| 2014/0248863 A1* | 9/2014 | Golsch | .................. | H04W 4/001 |
| | | | | 455/418 |
| 2015/0237186 A1* | 8/2015 | Kanekuni | ........... | H04M 1/7253 |
| | | | | 455/569.2 |

* cited by examiner

MANUAL BLUETOOTH HANDS FREE TRANSFER MODE

BACKGROUND

Technical Field

The present disclosure relates to a system for connecting a wireless device carried by an individual to a vehicle network, and more particularly, a method for manual initiation of audio transfer from a wireless device to a hands-free device.

Description of the Related Art

It is well known that a phone call while driving may decentralize the driver's attention. In order to prevent this, hands-free phone call methodologies have been widely used for enabling the driver to concentrate on driving without the use of hands.

An example early hands-free device included a wired device mounted on a mobile phone holder. But in recent years, Bluetooth technology has been applied to such devices, and thus phone calls are now possible even while leaving the mobile phone in a bag or pocket, for example.

Bluetooth is a short-range wireless communication technology derived from a specification of the IEEE 802.15.1, and it allows electronic devices, such as wireless terminals located within about 10 meters to wirelessly communicate with each other in a low cost and low power manner. Existing Bluetooth hands-free techniques output an audio signal transmitted from a paired mobile phone or MP3 player through the speaker provided in a vehicle and transmit the user's voice signal inputted through a microphone provided in a vehicle to the mobile phone when a call function of the mobile phone is used. The conventional Bluetooth specification was defined so that it automatically connects when a request for connection is received and automatically disconnects when a request for releasing the connection is received. In cases of Bluetooth technology being integrated in a vehicle, automatic transfer of active calls is not always desirable and may often cause customer dissatisfaction.

SUMMARY

An object of various embodiments of the present invention is to provide a method, computer program product and vehicle multimedia system for controlling audio signal transfer from a mobile device to a hands-free device.

In order to achieve the above objects, a method for controlling audio signal transfer from a mobile device to a hands-free device in a vehicle multimedia system according to an exemplary embodiment of the present invention may include receiving by a processor of the vehicle multimedia system a request from a mobile device to connect to a hands-free device. The processor may determine if the mobile device is engaged in an active call. In response to determining that the mobile device is engaged in an active call, a confirmation message may be displayed to confirm that a user wishes to transfer an audio signal associated with the active call to the hands-free device. In response to receiving user's confirmation to transfer the active call, the audio signal may be transferred from the mobile device to the hands-free device.

In an embodiment, continual requests to connect to the hands-free device may be rejected, in response to receiving user's disapproval of the active call transfer.

Further, in order to achieve the above objects, a computer program product for controlling audio signal transfer from a mobile device to a hands-free device in a vehicle multimedia system, according to an exemplary embodiment of the present invention, may include one or more computer-readable storage devices and a plurality of program instructions stored on at least one of the one or more computer-readable storage devices. The plurality of program instructions may include program instructions to receive a request from the mobile device to connect to the hands-free device. The plurality of program instructions may further include program instructions to determine if the mobile device is engaged in an active call. The plurality of program instructions may further include program instructions to display a confirmation message to confirm that a user wishes to transfer an audio signal associated with the active call to the hands-free device and program instructions to transfer the audio signal from the mobile device to the hands-free device, in response to receiving user's confirmation to transfer the active call.

In order to achieve the above objects, a vehicle multimedia system (with or without telematics) according to an exemplary embodiment of the present invention may include a hands-free device configured to receive, convert and transmit an audio signal received from a mobile device via a Bluetooth communication channel, to an audio system for subsequent audio transmission over a speaker system connected to said audio system and configured to receive, convert and transmit user's voice signal received via a microphone connected to the audio system for subsequent audio transmission to the mobile device via the Bluetooth communication channel and a controller configured to receive a request from the mobile device to connect to the hands-free device, determine if the mobile device is engaged in an active call, display a confirmation message to confirm that a user wishes to transfer an audio signal associated with the active call to the hands-free device, in response to determining that the mobile device is engaged in an active call, and transfer the audio signal from the mobile device to the hands-free device, in response to receiving user's confirmation to transfer the active call.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

The advantage and features of the embodiments disclosed herein and how to achieve the same will be explained through embodiments described in detail with the accompanying drawings. However, the disclosure is not limited to embodiments described herein and may be embodied in other aspects. Rather, the embodiments are provided for explaining to those skilled in the art to which this disclosure pertains to readily embody the technical spirit of the present disclosure.

In the drawings, embodiments of the present disclosure are not limited to the shown specific aspects and are exaggerated in order to clarify. Although specific terms are used herein, it is only used for explaining the disclosed embodiments, and it is not used for limiting the meaning or the scope of the embodiments described in the claims.

The expression "and/or" herein is used as the meaning including at least one of components listed before and after the expression. Also, the expression "connected/coupled" is used as the meaning including being directly connected with another component or indirectly connected through another component. A singular form herein also includes a plural form unless it is specially referred in a phrase. Also, the components, steps, operations and elements referred as "comprise" or "comprising" used herein mean the presence or addition of at least one of other components, steps, operations and elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

As used herein, the phrase "vehicle multimedia system" means an integrated information system with wireless communications capacity. These systems are sometimes referred to as in-vehicle information systems, and are often integrated with telematics, entertainment systems and/or navigation systems. Vehicle multimedia systems include, for example, but are not limited to, GM On-Star®, GM On-Star MyLink™, Chrysler UConnect®, Ford Sync®, Kia UVO®, Toyota Entune®, Hyundai BlueLink™ systems, and further includes other systems developed by these and other vehicle manufacturers and aftermarket component manufacturers.

Additionally, it is understood that the below methods for controlling audio signal transfer may be executed by at least one controller. The term "controller" refers to a hardware device that includes a memory and a processor. The memory is configured to store program instructions, and the processor is configured to execute the program instructions to perform one or more processes which are described further below.

One aspect of the present invention relies on Bluetooth protocols for setting up a wireless connection between one of the modules connected to a vehicle network and a remotely located mobile device. If a phone conversation is taking place the wireless connection can be used to transfer an audio signal associated with the phone conversation to the vehicle network for continuing the conversation using the hands free module in the vehicle. Currently, when an individual (hereinafter "customer" or simply "user") desires to enter the vehicle while conducting a phone conversation on a wireless device, the phone conversation can be automatically continued in the vehicle in a hands-free manner without the user carrying the phone having to press a button or perform any other task indicative of user's intention. However, at least in some situations, this automatic transfer of audio signal may cause inconvenience to the user of the vehicle. As a result, such situations typically cause customer dissatisfaction.

Various embodiments of the present invention are directed to eliminating the above inconvenience of the user by enabling the user to control an audio transfer process. Hereinafter, it is understood that the vehicles referenced below include a Bluetooth communication module for connecting with a terminal via Bluetooth.

Figure 1:
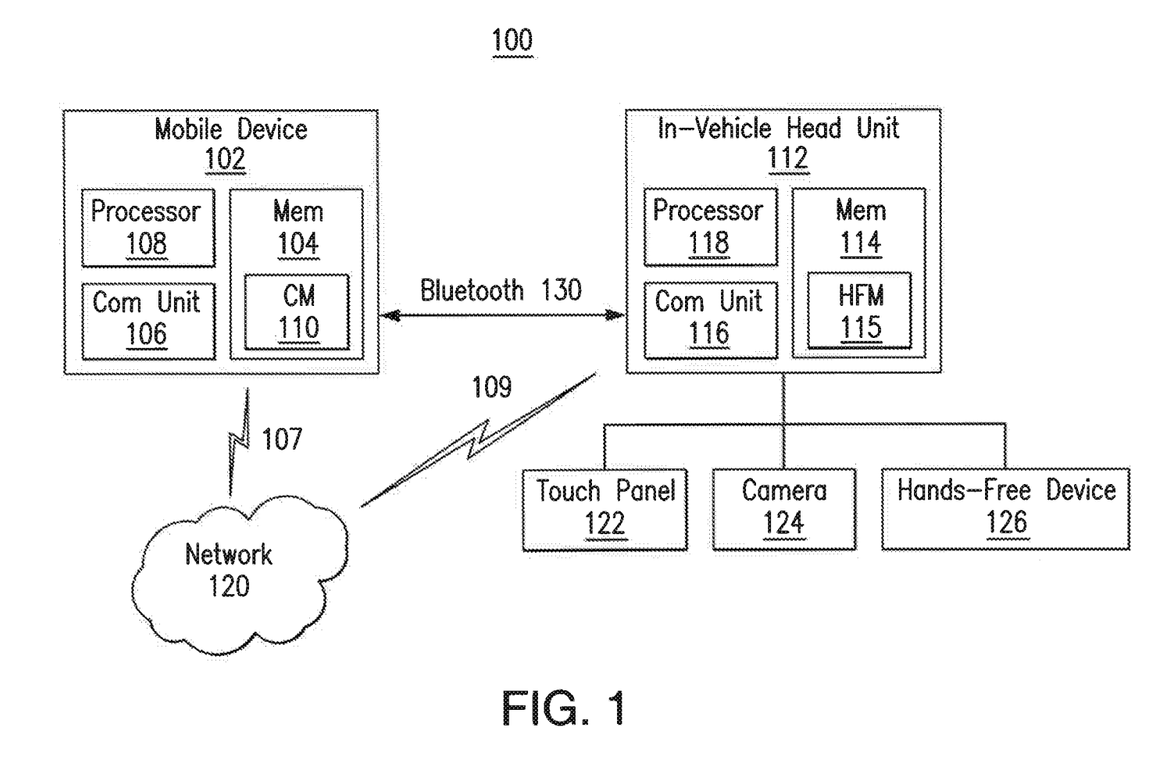
FIG. 1 is a block diagram illustrating an exemplary operating environment for various embodiments.

FIG. 1 is a block diagram illustrating an exemplary operating environment 100 for various embodiments. Operating environment 100 may include an in-vehicle computer system; one example of such a system is an in-vehicle head unit 112, which will be used as an example herein for ease of discussion. The operating environment 100 may also include a mobile device communication link 130 for communication between the in-vehicle head unit 112 and mobile device 102, a wireless communication link 107 between mobile device 102 and a network 120, and a wireless communication link 109 between in-vehicle head unit 112 and the network 120. The communication links described herein can directly or indirectly connect these devices. The network 120 can be a wireless communication network such as a cellular network comprised of multiple base stations, controllers, and a core network that typically includes multiple switching entities and gateways, as well as one or more other networks, such as, but not limited to, the Internet, a public-switched telephone network (PSTN), a packet-switching network, a frame-relay network, a fiber-optic network, and/or other types of networks.

In-vehicle head unit 112 and Bluetooth enabled mobile device 102 may communicate with each other via a communication link, such as Bluetooth link 130. In one embodiment, the in-vehicle head unit 112 can include a touch panel display system and/or an in-car PC system that includes a communication unit 116 to facilitate the communications, a memory unit device 114, and a processor 118. The in-vehicle head unit 112 can be part of a vehicle's multimedia system which includes memory/storage, processor(s) and communication unit(s). FIG. 1 shows the memory 114, communication unit 116 and processor 118 as being part of the in-vehicle head unit 112 for ease of discussion. The in-vehicle head unit 112 may also be integrated with peripherals, such as a touch panel 122, a camera 124, and a hands-free device 126.

In one arrangement, one aspect of an input device, the touch panel 122, and the display screen are integrated so as to provide an integrated input and display device (referred to herein after as touch panel 122), to enable both input of information (via direct input, menu selection, etc.) and display of information through the touch panel screen so that a user need only touch a portion of the touch panel 122 to select one of a plurality of display choices or to activate one of a plurality of virtual or "soft" buttons. In this respect, processor 118 supports a Graphical User Interface (GUI) that operates in conjunction with the touch panel 122.

Processors 108 and/or 118 process data signals and may comprise various computing architectures. Although only a single processor is shown in FIG. 1, multiple processors may be included in each device. The processors can comprise an arithmetic logic unit, a microprocessor, a general purpose computer, or some other information device equipped to transmit, receive and process electronic data signals from the memory 104, 114, and other devices both shown and not shown the figures.

The Bluetooth enabled mobile device 102 has an operating system and can include various applications either integrated into the operating system or stored in memory/storage 104 and executed by the processor 108. Examples of a mobile device 102 include a cellular phone, personal device assistant (PDA), smartphone, pocket personal computer (PC), laptop computer, tablet computer, smart watch or other devices having a processor, communications capability and are easily transportable, for example. In a common form a mobile device application could be part of a larger suite of vehicle features and interactions. In an embodiment, the mobile device 102 includes a communication unit 106, a memory unit device 104, and a processor 108. The mobile device 102 has an operating system and can include various applications either integrated into the operating system or stored in memory/storage 104 and executed by the processor 108.

The embodiments provide a management tool for the connection between the mobile device 102 and the in-vehicle head unit 112. In one embodiment, the communication management tool embodies software that can be installed on the mobile device 102 and the in-vehicle head unit 112. This software is able to setup a new connection or open an existing connection and is able to direct communication across any application connection to provide a high quality experience for the user. For example, a communication manager (CM) 110 may be installed on mobile device 102 and a hands-free manager (HFM) 115 may be installed on the in-vehicle head unit 112 and may be configured to manage connection 130. The communication manager 110 and HFM 115 can turn this connection on and direct the correct media across the Bluetooth communication channel 130

The 115 preferably provides support for hands-free processing. In one embodiment, the HFM 115 implements a Bluetooth protocol stack for connection to Bluetooth compliant hands-free devices 126 such as Bluetooth headset and Bluetooth car kits. In one specific embodiment, the hands-free manager 115 implements a Bluetooth headset profile and/or a Bluetooth hands-free profile. The HFM 115 allows the hands-free unit 126 to act as an auditory relay for an IP video call and for an audio only cellular call over the network 120, as well as perform other hands-free services. For example, in the case of an IP video call, the audio portion of the call may be routed through the hands-free unit 126 instead of a speaker of the mobile device 102 while the video portion of the call remains being displayed by the mobile device 102 (or by an attached display). The hands-free unit 126 may also include a microphone to capture audio information which is then transmitted to the mobile device 102. Thus, a user can use the hands-free unit 126 to talk and or listen to audio during an IP video call and/or during an audio only cellular call.

In existing techniques for managing a Bluetooth connection between a vehicle and a mobile device, if the user gets in the vehicle while conducting a phone conversation on mobile device 102, typically, upon establishing a connection between the mobile device 102 and in-vehicle head unit 112 at least the audio signal associated with the call is automatically transferred to hands-free device 126, regardless of the user intention. However, various embodiments of the present invention contemplate that HFM 115 may share control of the Bluetooth connection/transfer process with the user and, in some embodiments, may require the user to initiate the audio signal transfer process, as described below. As a result, the user has an opportunity to decide whether or not to switch an active phone call into the hands-free mode for each particular call.

Figure 2:
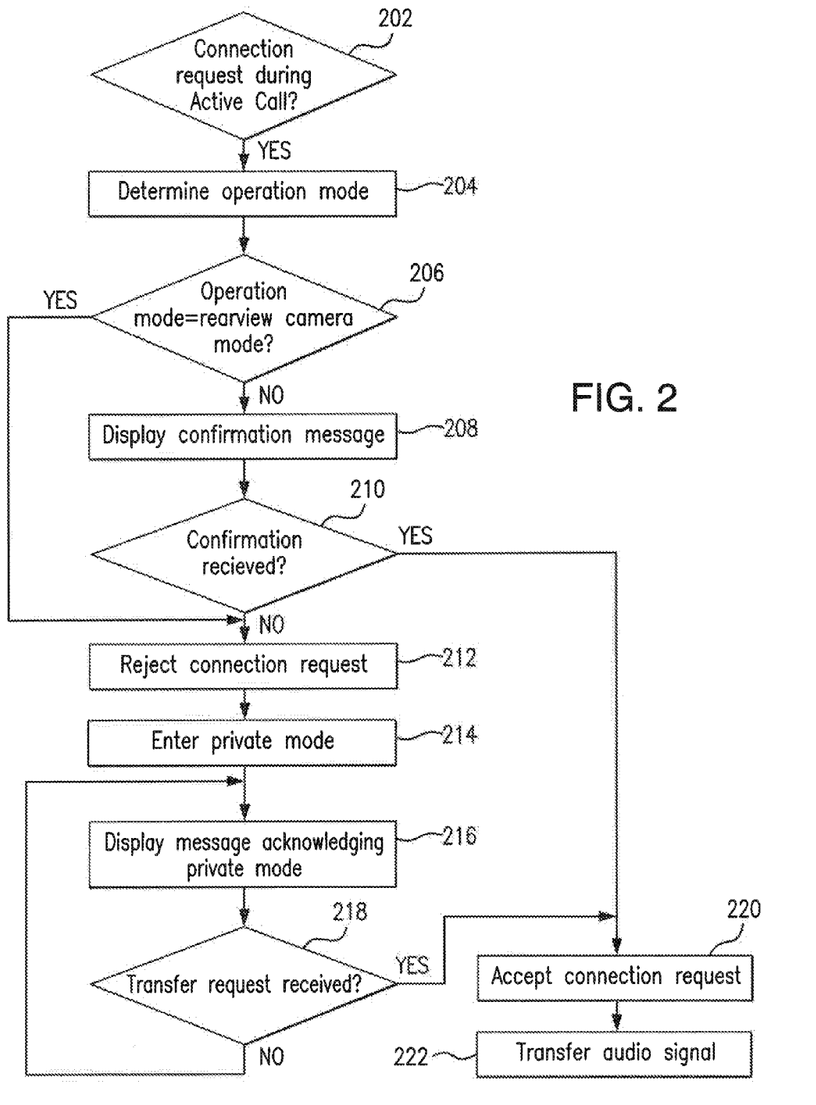
FIG. 2 is a flowchart of operational steps of the hands free module of FIG. 1 according to an illustrative embodiment of the present invention.

FIG. 2 is a flowchart of operational steps of the hands free module of FIG. 1 according to an illustrative embodiment of the present invention. Before turning to description of FIG. 2, it is noted that the flow diagram shown therein is described, by way of example, with reference to components shown in FIG. 1, although these operational steps may be carried out in any system and are not limited to the scenario shown in the aforementioned figures. Additionally, the flow diagram in FIG. 2 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

According to an embodiment of the present invention, HFM module 115 may comprise a component of the in-vehicle head unit 112 and may include and/or be connected to a Bluetooth interface. HFM 115 operates under the control of the processor 118. HFM 115 may be implemented in software. At step 202, HFM module 115 may detect presence of vehicle user's mobile device 102 by receipt of a Bluetooth connection request message from the mobile device 102 and a subsequent exchange of messages with the device 102 (to determine its type and its current state). For example, this subsequent exchange of messages may be utilized to determine whether the mobile device 102 requesting a connection is engaged in a telephone call and whether such call is in an "active" state. The term "telephone call" as used herein is generally synonymous with a "voice call" unless indicated otherwise. The term "active state" as used herein may mean an active instance of two-way communication, an attempt to establish two way communication, or a portion of the two-way communication depending on the context. For example, a user of the mobile device 102 can dial a telephone call in an attempt to establish two-way communication, and a call can be said to exist even prior to establishment of a two-way connection. In certain contexts, which will be made explicit, the call may encompass communications other than voice, e.g., video call, text messaging, chat, video chat, etc.

Various embodiments of the present invention contemplate that in-vehicle head unit 112 may be operated in several different modes, such as, media, phone call, navigational, rear-view camera and similar modes. According to one embodiment, at step 204, in response to detecting the presence of mobile device 102 and determining that mobile device 102 is currently operating in active state, HFM 115 may determine operation mode of the in-vehicle head unit 112. As noted above, in-vehicle head unit 112 may be integrated with camera 124, such as rear view camera. Generally, rear view or "back up" cameras in vehicles are used to assist drivers when parking the vehicle or exiting from a parking space. Rear view cameras display an image of a blind spot behind the vehicle. In certain situations, in-vehicle head unit 112 may enter a corresponding rear view camera mode to display the blind spot image on touch panel 122. Typically, at least some of the in-vehicle head unit 112 functionality may be temporarily disabled in certain modes. For example, processor 118 may prevent a change to the display state when in-vehicle head unit 112 operates in a rear-view camera mode.

According to an embodiment of the present invention, HFM 115 may enable a user to indicate their inclination with respect to the transfer of the active phone call by generating a confirmation screen. However, HFM 115 may present the generated screen to the user only if such functionality is supported in current operation mode of the in-vehicle head unit 112. For instance, in response to determining that in-vehicle head unit 112 operates in a rear-view camera mode (step 206, yes branch), steps 208 and 210 may be skipped by HFM 115. In some embodiments, HFM 115 may perform steps 208 and 210 upon exiting the rear-view camera mode. If HFM 115 determines that in-vehicle head unit's 112 operating mode is different from the rear-view camera mode (step 206, no branch), at 208, HIM 115 may display a confirmation screen on the touch panel 122. It is noted that in some cases, for example when the user just entered the vehicle, the confirmation screen is displayed when the head unit's touch panel 122 initializes after the vehicle is turned on.

Figure 3:
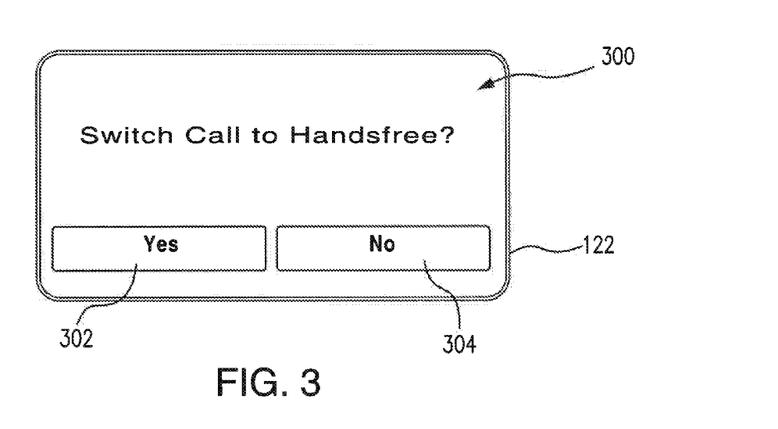
FIG. 3 illustrates an exemplary pop-up display screen which may be displayed upon user entering a vehicle and turning an ignition switch while being engaged in an active call according to an embodiment of the present invention.

Turning to FIG. 3, it shows an exemplary pop-up display screen 300 which may be displayed upon customer entering a vehicle and turning an ignition switch while being engaged in an active call according to an embodiment of the present invention. FIG. 3 shows a physical display screen of touch panel 122. In this illustrative example, the user may be prompted by the pop-up display screen 300 with a message "Switch Call to Handsfree?," at which time the user may respond by selecting one of the soft buttons indicating "Yes" 302, or "No" 304, that may be presented by the pop-up display screen 300. According to one embodiment of the present invention, the user may initiate the transfer of the audio signal from mobile device 102 to hands free device 126 by selecting the "Yes" button 302. In an alternative embodiment, users may utilize a physical knob, such as a tuning knob and/or a volume knob, which users can manipulate to provide their selection, as well as switches, such as on the steering wheel or instrument panel. In yet another embodiment, users may indicate their desire to transfer the call to the hands free device 126 by pressing a pre-programmed hot key on the mobile device 102. For example, the hot keys may be implemented as a long press on a particular key (e.g., "CALL" key) during the active call.

Referring back to FIG. 2, at 210, HFM 115 may determine if the user desires to transfer the on-going call to hands-free device 126 by checking whether the "Yes" button 302 was selected/pressed. It is noted that in some embodiments, HFM 115 may display the pop-up display screen 300 with the message "Switch Call to Handsfree?" for a predetermined time period. The display screen 300 may disappear after a predetermined period of time expires if the user does nothing. In one embodiment this predetermined time period may range from about 20 seconds to about 30 seconds. In response to receiving an answer indicating that the user does not wish to transfer the call and/or in response to not receiving an answer during the predetermined time period (step 210, no branch), at 212, HFM 115 may reject the Bluetooth connection request message from the mobile device 102 received at step 202, as well as any successive Bluetooth connection request messages that may be sent by mobile device 102 while HFM 115 operates in a private mode.

Figure 4:
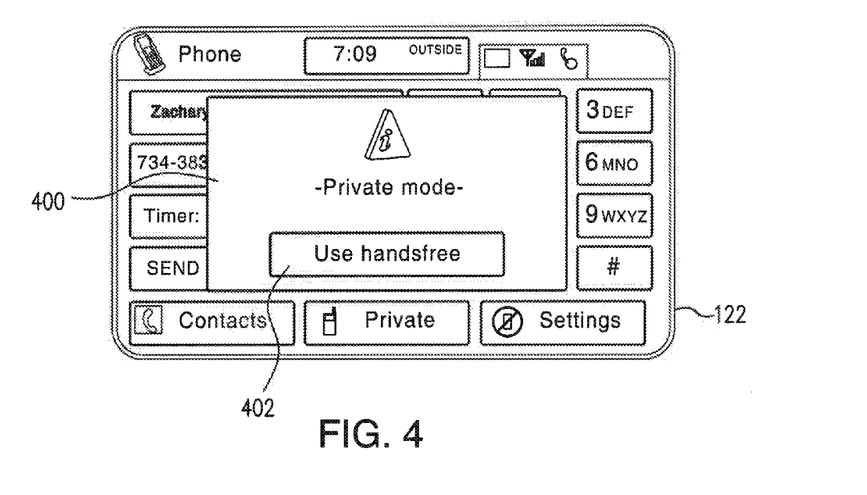
FIG. 4 illustrates an exemplary pop-up display screen which may be displayed when the hands free module of FIG. 1 enters a private mode according to an embodiment of the present invention.

According to an embodiment of the present invention, if the user is not interested in transferring the on-going call to the hands-free device 126, HFM 115 may enter into a private mode, at 214. When HFM 115 operates in a private mode other occupants in the vehicle are not able to hear a conversation between the user and the other party. In other words, while the HFM 115 is in the private mode, the conversation between the user and the other party on another phone is not broadcast over the speakers in the vehicle. Next, at 216, HFM 115 may display a private-mode indicating message. FIG. 4 illustrates an exemplary pop-up display screen 400 which may be displayed on physical touch panel 122 when HFM 115 enters a private mode according to an embodiment of the present invention. In a non-limiting example of FIG. 4, display screen 400 may include a "Private mode" message and may include at least one soft button 402. If the telephone call is completed while HFM 115 operates in the private mode, HFM 115 may return to a previously displayed screen (i.e. screen displayed prior to entering the private mode).

In the event the user of mobile device 102 wishes to switch to a hands free mode (e.g., to transfer the call to hands-free device 126), the user may initiate such call transfer by selecting "Use handsfree" soft button 402. In alternative embodiments, the user may manipulate one or more physical knobs and/or switches, such as a tuning knob and/or a volume knob, attached, for example, to touch panel 122 or may press a pre-programmed hot key on the mobile device 102 in order to switch to a hands free mode. Referring back to FIG. 2, in response to detecting user's desire to transfer the call to hands-free device 126 (step 218, yes branch) or in response to receiving user's confirmation at step 210 (yes branch), at step 220, HFM 115 may establish a connection with the Bluetooth enabled mobile device 102 in response to the connection request received at step 202. Once the Bluetooth connection has been established, HFM 115 may transfers audio signal associated with the active telephone call from mobile device 102 to hands-free device 126, at 222, and may enter a hands free call mode.

Figure 5A:
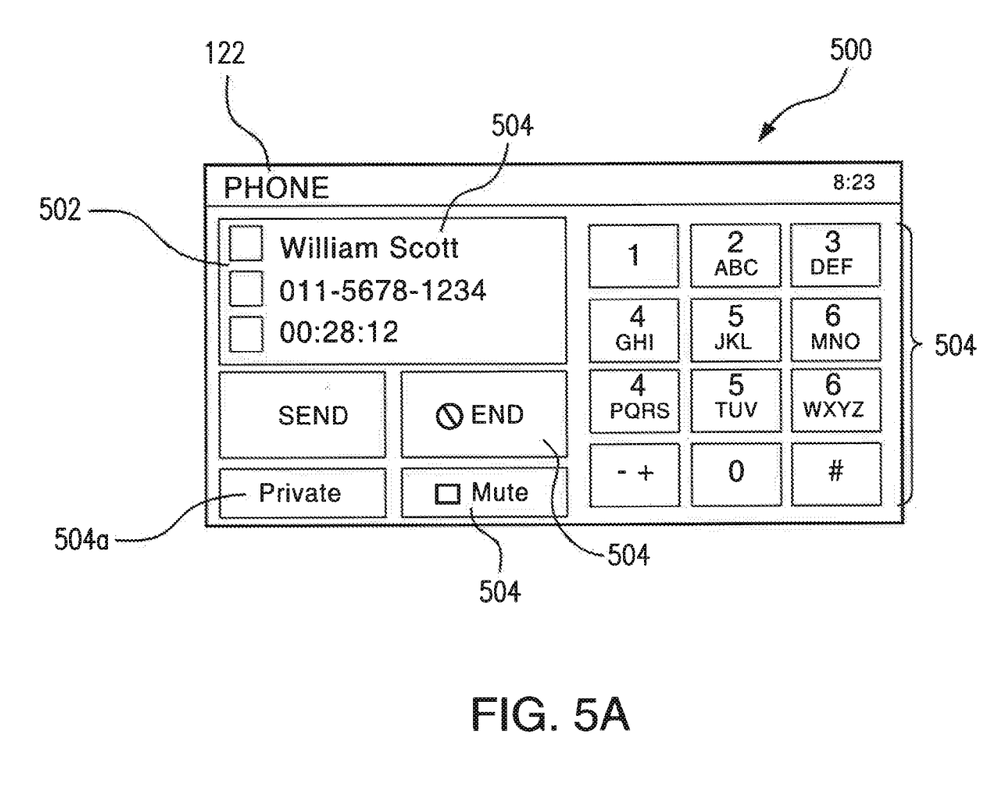
FIGS. 5A-5B illustrate exemplary screen shots which may be displayed subsequent to audio signal transfer responsive to users' confirmation in accordance with an embodiment of the invention.
Figure 5B:
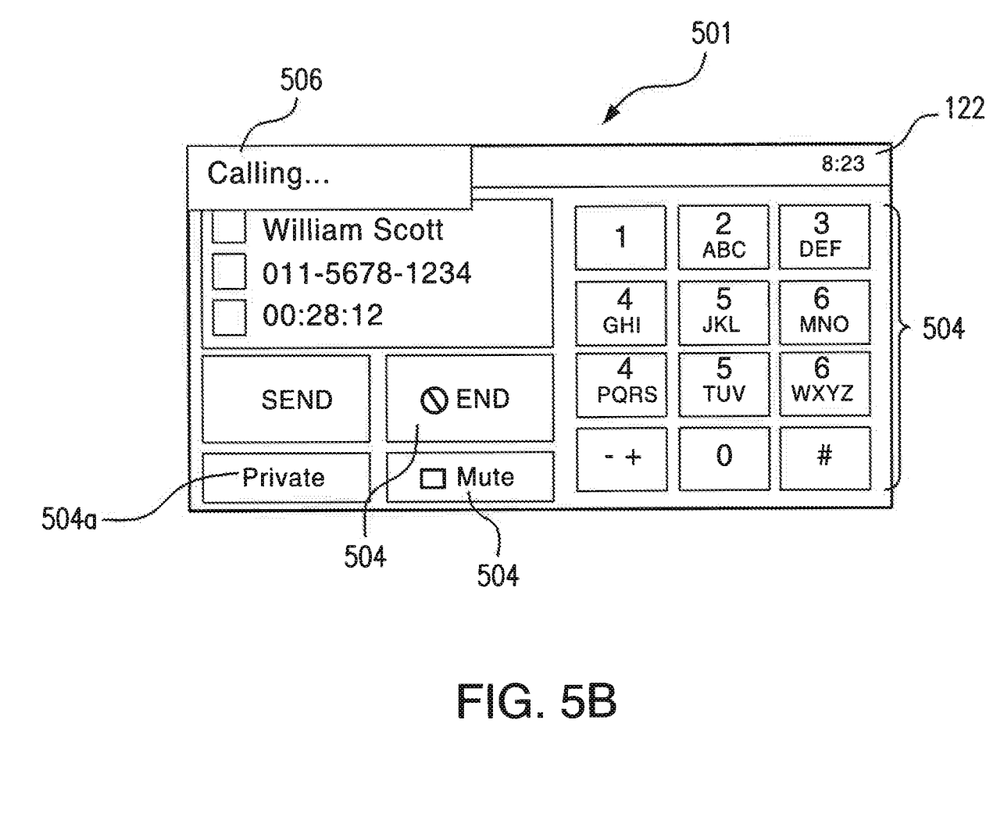

FIGS. 5A-5B illustrate exemplary screen shots which may be displayed by HFM 115 after said audio signal transfer takes place in accordance with an embodiment of the invention. The first exemplary phone mode screen 500 (illustrated in FIG. 5A) may be displayed if an active instance of two-way communication between user's mobile device 102 and the other party already exists. The second exemplary phone mode screen 501 (illustrated in FIG. 5B) may be displayed prior to establishment of a two-way connection between mobile device 102 and the other party. Both first 500 and second 501 screens may provide information related to the conducted call. For example, as shown in FIG. 5A, phone mode semen 500 preferably displays information 502 related to the name and number of the calling/called party as well as call duration. Further, second phone mode screen 501 preferably displays a message 506 indicating that HFM 115 attempts to establish two way communications with the calling party.

According to embodiments of the present invention, HFM module 115 cooperates with mobile device 102 in answering and placing calls and manages the hard and soft buttons and various display screens on the touch panel 122 related to telephony actions. Telephony actions may include call initiation, call control and audio control categories. Accordingly, to support these actions, HFM 115 may provide a plurality of soft (programmed) buttons 504 on phone mode screens 500 and 501. It is noted that soft button provided by HFM 115 provides for call and audio control purposes may include end call, HFM mute and private mode buttons. For example, in the event the user does not want other occupants in the vehicle to hear a portion of the conversation, the user may select the private mode button 504a to enable the private mode. In response, HFM 115 removes the conversation from being broadcast to the occupants in the vehicle.

In view of the above description, the method for controlling audio signal transfer from a mobile device to a hands-free device in a vehicle multimedia system can overcome inconvenience resulting from automatic transfer of active calls between a mobile device and a hands-free device. Specifically, according to various embodiments of the present invention, a transfer of audio signal associated with an active call may be initiated only in response to users' input (such as, confirmation of their decision to utilize a hands-free operation).

In the above description, the disclosed embodiments have been described through specific examples, but it may be well understood that various modifications can be made without departing from the scope of the present disclosure. Therefore, the scope of the present disclosure is not limited to the above described embodiments, and it should be defined by the appended claims and their equivalents. When taking the foregoing description into account, if the modifications and variations of the embodiments fall within the following claims and their equivalents, then it is construed that the present disclosure includes these modifications and variations.

What is claimed is:

1. A method for controlling audio signal transfer from a mobile device to a hands-free device in a vehicle multimedia system, the method comprising steps of:
   receiving, by a processor of the vehicle multimedia system, a request from the mobile device to connect to the hands-free device;
   determining, by the processor, if the mobile device is engaged in an active instance of two-way communication prior to the mobile device connecting to the hands-free device;
   displaying, by the processor, a confirmation message to confirm that a user wishes to transfer an audio signal associated with the active instance of two-way communication to the hands-free device, in response to determining that the mobile device is engaged in the active instance of two-way communication;
   accepting, by the processor, the request from the mobile device to connect to the hands-free device in response to receiving confirmation that the user wishes to transfer the audio signal to the hands-free device; and
   transferring, by the processor, the audio signal from the mobile device to the hands-free device when the request from the mobile device to connect to the hands-free device is accepted.

2. The method according to claim 1, wherein the hands-free device is configured to communicate with the mobile device via a Bluetooth communication channel.

3. The method according to claim 1, further comprising rejecting, by the processor, the request to connect to the hands-free device, in response to receiving user's disapproval of the active call transfer.

4. The method according to claim 3, further comprising displaying a message acknowledging that the hands-free device operates in a private mode.

5. The method according to claim 4, wherein displaying the message further comprises displaying a soft button to provide the user an opportunity to initiate said transfer of the audio signal from the mobile device to the hands-free device while the hands-free device operates in the private mode.

6. The method according to claim 5, further comprising transferring the audio signal from the mobile device to the hands-free device while the hands-free device operates in the private mode, in response to user's selection of the soft button.

7. The method according to claim 1, wherein the confirmation message is not displayed when the vehicle multimedia system is operated in a rear-view camera mode.

8. A computer program product for controlling audio signal transfer from a mobile device to a hands-free device in a vehicle multimedia system, the computer program product comprising:
   one or more computer-readable storage devices and a plurality of program instructions stored on at least one of the one or more computer-readable storage devices, the plurality of program instructions comprising:
   program instructions to receive a request from the mobile device to connect to the hands-free device;
   program instructions to determine if the mobile device is engaged in an active instance of two-way communication prior to the mobile device connecting to the hands-free device;
   program instructions to display a confirmation message to confirm that a user wishes to transfer an audio signal associated with the active instance of two-way communication to the hands-free device, in response to determining that the mobile device is engaged in the active instance of two-way communication;
   program instructions to accept the request from the mobile device to connect to the hands-free device in response to receiving confirmation that the user wishes to transfer the audio signal to the hands-free device; and
   program instructions to transfer the audio signal from the mobile device to the hands-free device when the request from the mobile device to connect to the hands-free device is accepted.

9. The computer program product of claim 8, wherein the hands-free device is configured to communicate with the mobile device via a Bluetooth communication channel.

10. The computer program product of claim 8, further comprising program instructions to reject the request to connect to the hands-free device, in response to receiving user's disapproval of the active call transfer.

11. The computer program product of claim 10, further comprising program instructions to display a message acknowledging that the hands-free device operates in a private mode.

12. The computer program product of claim 11, wherein the program instructions to display the message comprise program instructions to display a soft button to provide the user an opportunity to initiate said transfer of the audio signal from the mobile device to the hands-free device while the hands-free device operates in the private mode.

13. The computer program product of claim 12, further comprising program instructions to transfer the audio signal from the mobile device to the hands-free device while the hands-free device operates in the private mode, in response to user's selection of the soft button.

14. The computer program product of claim 8, wherein the confirmation message is not displayed when the vehicle multimedia system is operated in a rear-view camera mode.

15. A vehicle multimedia system, comprising:
   a hands-free device configured to receive, convert and transmit an audio signal received from a mobile device via a Bluetooth communication channel, to an audio system for subsequent audio transmission over a speaker system connected to said audio system and configured to receive, convert and transmit user's voice signal received via a microphone connected to the audio system for subsequent audio transmission to the mobile device via the Bluetooth communication channel; and a controller configured to receive a request from the mobile device to connect to the hands-free device, determine if the mobile device is engaged in an active instance of two-way communication prior to the mobile device connecting to the hands-free device, display a confirmation message to confirm that a user wishes to transfer an audio signal associated with the active instance of two-way communication to the hands-free device, in response to determining that the mobile device is engaged in the active instance of two-way communication, accept the request from the mobile device to connect to the hands-free device in response to receiving confirmation that the user wishes to transfer the audio signal to the hands-free device, and transfer the audio signal from the mobile device to the hands-free device when the request from the mobile device to connect to the hands-free device is accepted.

16. The vehicle multimedia system according to claim 15, wherein the controller is further configured to reject the request to connect to the hands-free device, in response to receiving user's disapproval of the active call transfer.

* * * * *